Aug. 23, 1955  F. E. ALTMAN  2,715,855
TELEPHOTO OBJECTIVE ZONALLY CORRECTED
FOR SPHERICAL ABERRATION
Filed Nov. 3, 1953  2 Sheets-Sheet 1
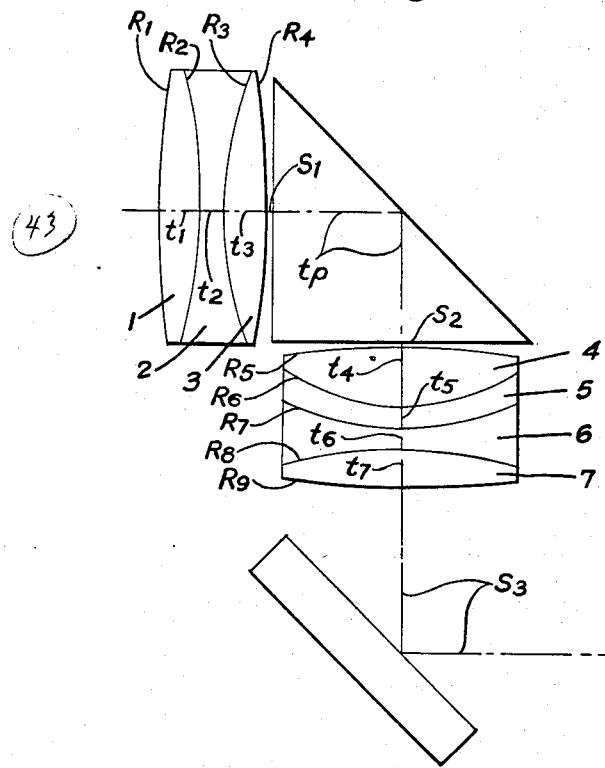
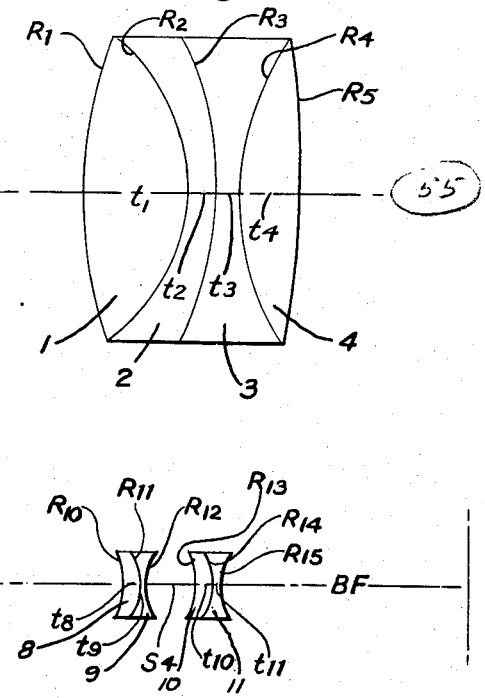
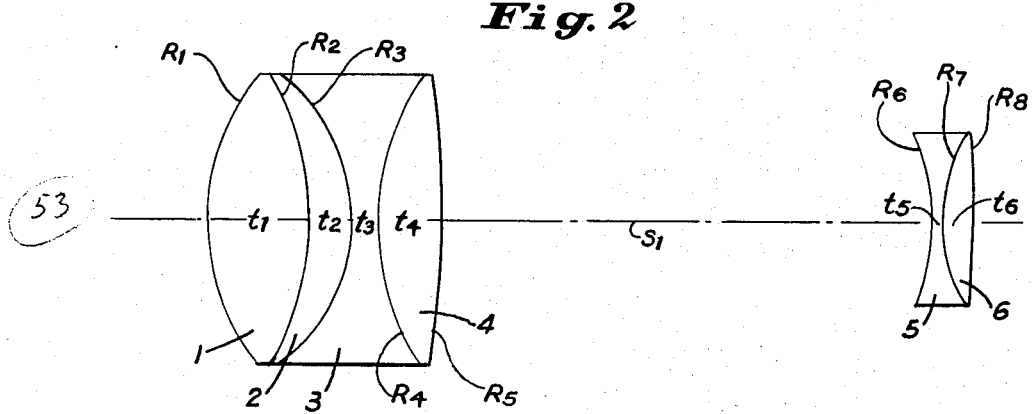
Fred E. Altman
INVENTOR.
BY
ATTORNEY
AGENT

Fig. 4

| EF = 100 mm. | | | | f/5.5. |
|---|---|---|---|---|
| Lens | N | V | Radii | Thicknesses |
| 1 | 1.5256 | 54.6 | $R_1 = +6.723$ mm. | $t_1 = 0.270$ mm. |
| 2 | 1.6350 | 43.8 | $R_2 = -4.251$ | $t_2 = 0.157$ |
| 3 | 1.6384 | 55.5 | $R_3 = +3.124$ | $t_3 = 0.292$ |
| | | | $R_4 = -14.98$ | $S_1+S_2 = 0.073$ |
| PRISM | 1.5170 | 64.5 | | $t_p = 1.822$ |
| 4 | 1.5286 | 51.6 | $R_5 = +6.228$ | $t_4 = 0.401$ |
| 5 | 1.5230 | 58.6 | $R_6 = -1.485$ | $t_5 = 0.146$ |
| 6 | 1.6350 | 43.8 | $R_7 = -2.694$ | $t_6 = 0.146$ |
| 7 | 1.6203 | 60.3 | $R_8 = +3.391$ | $t_7 = 0.273$ |
| | | | $R_9 = -11.72$ | $S_3 = 4.064$ |
| 8 | 1.6490 | 33.8 | $R_{10} = -3.347$ | $t_8 = 0.062$ |
| 9 | 1.5170 | 64.5 | $R_{11} = -0.2325$ | $t_9 = 0.022$ |
| | | | $R_{12} = +0.1655$ | $S_4 = 0.169$ |
| 10 | 1.6490 | 33.8 | $R_{13} = -0.6607$ | $t_{10} = 0.062$ |
| 11 | 1.5170 | 64.5 | $R_{14} = -0.1655$ | $t_{11} = 0.022$ |
| | | | $R_{15} = +0.2075$ | $BF = 2.238$ |

Fig. 5

| EF = 100 mm. | | | | f/5.5. |
|---|---|---|---|---|
| Lens | N | V | Radii | Thicknesses |
| 1 | 1.5189 | 57.3 | $R_1 = +18.657$ mm. | $t_1 = 3.50$ mm. |
| 2 | 1.6511 | 38.3 | $R_2 = -19.685$ | $t_2 = 1.50$ |
| 3 | 1.6350 | 43.8 | $R_3 = -12.019$ | $t_3 = 1.40$ |
| 4 | 1.6030 | 60.7 | $R_4 = +12.019$ | $t_4 = 2.90$ |
| | | | $R_5 = -211.63$ | $S_1 = 26.63$ |
| 5 | 1.6109 | 57.2 | $R_6 = -10.45$ | $t_5 = 0.53$ |
| 6 | 1.6050 | 38.0 | $R_7 = +7.49$ | $t_6 = 1.05$ |
| | | | $R_8 = -73.23$ | $BF = 24.25$ |

Fig. 6

| EF = 100 mm. | | | | f/5.5. |
|---|---|---|---|---|
| Lens | N | V | Radii | Thicknesses |
| 1 | 1.5256 | 54.6 | $R_1 = +18.676$ mm. | $t_1 = 4.00$ mm. |
| 2 | 1.5170 | 64.5 | $R_2 = -11.875$ | $t_2 = 1.40$ |
| 3 | 1.6350 | 43.8 | $R_3 = -19.012$ | $t_3 = 1.40$ |
| 4 | 1.6210 | 61.5 | $R_4 = +10.589$ | $t_4 = 2.80$ |
| | | | $R_5 = -688.75$ | $S_1 = 25.90$ |

Fred E. Altman
INVENTOR.

BY Daniel I. Mayne
Harold F. Bennett
ATTORNEY & AGENT

United States Patent Office 2,715,855
Patented Aug. 23, 1955

2,715,855

TELEPHOTO OBJECTIVE ZONALLY CORRECTED FOR SPHERICAL ABERRATION

Fred E. Altman, Rochester, N. Y., assignor to Eastman Kodak Company, Rochester, N. Y., a corporation of New Jersey Application November 3, 1953, Serial No. 390,053

2 Claims. (Cl. 88—57)

This invention relates to telephoto objectives and particularly to objectives with high telephoto magnification.

An object of the invention is to provide a telephoto objective highly corrected for zonal spherical aberration and spherochromatism and apochromatically corrected for color.

It is an object of a particular form of the invention to provide an extremely high-powered telephoto objective, several times as strong as customary.

Telephoto objectives are characterized by having a positive front member and a negative rear member so that both nodal points of the objective are in front of the objective. A classical form of the telephoto objective has a positive member with a power of 2P and a negative member with a power of —2P where P is the power of the whole objective, these two members being separated so that rays from a distant axial point (being rendered convergent by the positive member) strike the negative member at one-half the height at which they strike the positive member. Thus, assuming equal refractive indices, the Petzval sum is neutralized but the power is not. It may be noted that stronger telephoto systems than this tend toward a negative Petzval sum. The trend in recent years has been toward objectives with weaker power than this classical form, so that the residual aberrations would be smaller, particularly the zonal spherical aberrations and the distortion, or optionally so that the objectives could be made up with a larger relative aperture for any given degree of complexity of structure.

On theoretical grounds it is convenient to define the telephoto power of a telephoto objective (to be distinguished from the dioptric power mentioned above) as the ratio of the focal length of the objective as a whole to the focal length of the front component alone, this being the magnification produced by the negative component. The greater this telephoto power, the stronger the telephoto effect. On practical grounds it is more convenient to define the telephoto effect by specifying the total length from the front vertex of the front member to the principal focal plane behind the rear member, this total length ordinarily ranges from close to 100 percent in weak telephoto lenses down to about 50 percent or less in some of the older telephoto objectives. This latter method of defining the telephoto effect takes into account the thickness of the individual members, a factor which is not allowed for in the theoretical definition of telephoto power.

The reason that strong telephoto lenses are liable to have such huge zonal aberrations is that the magnification in the axial direction produced by the negative member is equal to the square of the magnification in the transverse direction, as stated in optical textbooks. Thus the classical form of telephoto objective has a magnification of two and the zonal aberrations of the front component are magnified four times in the final image. If, however, one were to make a telephoto objective with a magnification of three or four, the zonal aberrations would be magnified nine to sixteen times. Thus the zonal aberrations get completely out of hand very rapidly as the telephoto magnification is increased.

According to the present invention, a telephoto objective is made up of a positive front member and a negative rear member in which the positive front member comprises one or more positive components characterized by at least one of the components being convex to the front and being made up of four lens elements cemented together and forming three interfaces. These three interfaces are as follows: One interface is concave to the front and has negative power, the refractive index difference at this interface being between 0.05 and 0.35. This interface corresponds in function to the cemented surface usually found in telescope doublets and in doublets used in the front members of telephoto objectives. That is to say, it is primarily for correcting spherical aberration and usually also aids in correcting axial color. A second interface is also concave to the front and has positive power and a radius of curvature between 0.4 and 0.8 times that of the negative interface, the refractive index difference at this surface being between —0.003 and —0.035. This interface is primarily for correcting zonal spherical aberration, and also spherochromatism. Either of these two interfaces may be in front of the other. The third interface is behind the other two, is convex to the front and is followed by a lens element having a dispersive index V at least 30% and preferably more than 40% greater than that of the element immediately in front of it. The dispersive index of this rear lens element may be as large as known glass types permit, that is it may range up to about 100 for certain low refractive indices. This third interface is primarily for correcting chromatic aberration, and the refractive index difference has a comparatively minor effect upon the spherical aberration and coma (assuming that the power of the whole component is maintained by changing the curvature of the rear surface thereof when substituting a glass of different refractive index in the rear element). A zero refractive index difference at this third interface is convenient from a design standpoint, since the curvature may then be adjusted for color correction without affecting the monochromatic aberrations. On the other hand, it is desirable to make the fourth lens element of a low refractive index material to help in counteracting the tendency toward negative Petzval sum in strong telephoto systems. The refractive index of the fourth element may be as low as known optical materials permit, or down to about 1.38, and may be as much as 0.05 higher than the index of the third element. The larger the field angle to be covered the more important the Petzval correction. In view of all these considerations it will be seen that an optimum index under all conditions of use cannot be specified for the fourth element.

According to a preferred feature of the invention the third lens element counting from the front of the component is made of a short glass for correcting the secondary color. A short glass may be defined as a glass in which $$\frac{N_{G'}-N_F}{N_F-N_C} \leq (0.672 - 0.00185V)$$

where $N_{G'}$, $N_F$ and $N_C$ are the refractive indices for the G', F, and C lines of the spectrum respectively and V is the dispersive index of said glass. A full correction of this aberration is attainable, and even overcorrection in some forms of the invention. Short glasses are commercially available ranging from 1.52 to about 1.90 in index. Those with indices higher than about 1.63 are borate glasses produced by the Eastman Kodak Company. An index above 1.60 is preferable, and since the lens element is not exposed to air, chemical stability is not of foremost importance.

The third element is negative, and its dispersive index should be lower than 50 so that the primary axial color is corrected without the use of excessively strong curvatures, particularly that of the third interface. However, short glasses are not at present available having a dispersive index lower than 30, so that in this preferred form of the invention the dispersive index of the third element is between 30 and 50.

The zonal spherical aberration is corrected at the positive interface by reason of the stronger curvature contributing proportionately more higher order aberration than the negative interface.

According to another preferred feature of the invention, the spherochromatism or variation of spherical aberration with color is corrected at the positive interface by the dispersive index of the medium behind this interface being larger than that of the medium in front of it, and preferably 8% to 30% larger. The greater this difference the less the overcorrection of spherical aberration for short wave lengths compared with that for longer wave lengths. This difference is easy to adjust during design if one of the glasses is selected from a group of available glasses having substantially equal refractive indices but different dispersive indices such as the borosilicate crown and ordinary crown group or the dense barium crown group.

Both of these preferred features of the invention may be and preferably are used together in one objective.

The theory of cemented quadruplet components of this type, adapted for use as telescope objectives, has been described in my earlier Patent No. 2,500,017 issued March 7, 1950.

According to a special form of my invention an extremely strong telephoto objective having telephoto power or magnification is made up in which the positive member comprises two positive components at least one of which is a quadruplet as described above and the negative member comprises two biconcave acromats. The other component of the front member should be at least a doublet and is preferably at least a semi-apochromatic triplet such as was also described in my earlier patent.

The surface curvatures are generally not the same as for telescope objective components, and in general they are determined as described below, both for telephoto objectives with single component positive members and for the more complex forms.

It is usually found that the negative component of a telephoto combination contributes toward overcorrection of spherical aberration, that is it contributes positive spherical aberration and also contributes coma of the same sign. By tracing marginal and zonal aberration rays backwards through the rear member (or by other known methods) it is comparatively easy to determine the exact amounts of marginal and zonal spherical aberration and coma required in the front member for correcting the whole system. The same methods are then used to bring these aberrations to these required values as are used to bring the aberrations of a telescope objective to zero. If it is then found necessary to modify the rear component to correct the field aberrations, the above process is repeated for a closer approximation, and as many times as necessary until a final design is determined. Usually the front surface will have a stronger curvature than that described in my earlier patent as being suitable for telescope objectives.

In a preferred form of the invention this process is carried out in two colors for correcting the spherochromatism of the objective.

In the accompanying drawings:

Fig. 1 shows a very strong telephoto objective according to a preferred form of the invention.

Fig. 2 shows a two-component telephoto objective according to the invention.

Fig. 3 shows the positive member only of a telephoto objective similar to that of Fig. 2.

Fig. 4 gives data for a specific example according to Fig. 1.

Fig. 5 gives data for an example according to Fig. 2, and

Fig. 6 gives data for an example according to Fig. 3.

All the lenses are shown in diagrammatic axial section.

Fig. 1 shows an extreme telephoto system having a telephoto power or magnification of 17.5 and a total length from front vertex to principal focal plane equal to 10% of the equivalent focal length. It was designed to cover a very narrow field of ±10 minutes of arc. The positive member comprises two components, the front one being a cemented triplet and the rear one a cemented quadruplet, and the negative member comprises two biconcave achromats spaced a short distance apart. This system was made up with a focal length of over a meter and in a form similar to a trench periscope, a 45° reflecting prism being provided between the two front components and a front-reflecting 45° mirror between the positive and negative members. This objective performed satisfactorily, although an objective designed according to the prior art had been tried and found to have completely intolerable zonal aberrations.

The specifications of this objective reduced to the customary focal length of 100 mm. are given in Fig. 4 and repeated in the table below.

*Example 1, Figs. 1 and 4*

| Lens | N | V | Radii, mm. | Thickness, mm. |
|---|---|---|---|---|
| 1 | 1.5256 | 54.6 | $R_1 = + 6.723$ | $t_1 = 0.270$ |
| 2 | 1.6350 | 43.8 | $R_2 = - 4.251$ | $t_2 = 0.157$ |
| 3 | 1.6384 | 55.5 | $R_3 = + 3.124$ | $t_3 = 0.292$ |
|   |        |      | $R_4 = -14.98$  | $s_1+s_2 = 0.073$ |
| Prism | 1.5170 | 64.5 |  | $t_p = 1.822$ |
| 4 | 1.5286 | 51.6 | $R_5 = + 6.228$ | $t_4 = 0.401$ |
| 5 | 1.5230 | 58.6 | $R_6 = - 1.485$ | $t_5 = 0.146$ |
| 6 | 1.6350 | 43.8 | $R_7 = - 2.694$ | $t_6 = 0.146$ |
| 7 | 1.6203 | 60.3 | $R_8 = + 3.391$ | $t_7 = 0.273$ |
|   |        |      | $R_9 = -11.72$  | $s_3 = 4.064$ |
| 8 | 1.6490 | 33.8 | $R_{10} = - 3.347$ | $t_8 = 0.062$ |
| 9 | 1.5170 | 64.5 | $R_{11} = - 0.2325$ | $t_9 = 0.022$ |
|   |        |      | $R_{12} = + 0.1655$ | $s_4 = 0.169$ |
| 10 | 1.6490 | 33.8 | $R_{13} = - 0.6607$ | $t_{10} = 0.062$ |
| 11 | 1.5170 | 64.5 | $R_{14} = - 0.1655$ | $t_{11} = 0.022$ |
|    |        |      | $R_{15} = + 0.2075$ | $BF = 2.238$ |

In this table and in Fig. 4 the lens elements are numbered in order from front to rear and the prism is listed by name in the first column, the corresponding refractive indices N for the D line of the spectrum and the dispersive indices V are given in the second and third columns, and the radii of curvature R of the lens surfaces, the thickness $t$ of the lens elements and the spaces $s$ between optical elements, each numbered by subscripts in order from front to rear are given in the last two columns, as are also the axial path length $t_p$ in the prism and the back focal length BF of the objective.

The positive member comprises two components of which the front one is a cemented triplet and the rear one a cemented quadruplet, both substantially as described in my patent referred to above, with the minor modification that elements 2 and 6 are made of a higher index short flint glass than was commercially available at that time. This glass is made by Eastman Kodak Company and has the following characteristics:

$N_C = 1.63077$
$N_D = 1.63500$
$N_F = 1.64525$
$N_{G'} = 1.65370$
$N_h = 1.66022$
$V = 43.8$ $$\frac{N_{G'} - N_F}{N_F - N_C} = 0.584 = (0.665 - 0.00185V)$$

It is the relatively short blue spectrum in this glass that gives this objective its apochromatic correction.

The sum $s_1+s_2$ of the two air spaces within the front member is given in the table since the prism may be shifted, increasing the one space and decreasing the other, without any effect on the final image whatever.

The negative member consists of two biconcave achromatic doublets shaped so that the marginal aberration ray is bent in four roughly equal steps at the four glass-air surfaces. This form was found to be a favorable one in this extremely strong telephoto objective, but the invention is not limited to any particular structure in the negative member.

The spherical aberration of the system was computed in F, G' and h wavelengths and is as follows:

|  | F | G' | h |
|---|---|---|---|
| f/55 | +0.141 | −0.052 | +0.025 |
| f/78.5 | −0.054 | −0.045 | +0.099 |
| Paraxial | .000 | −0.110 | +0.026 |

In each case the difference between the intersection length of the specified ray and that of the paraxial F ray is given. When it is considered that the longitudinal magnification caused by the negative member is $(17.5)^2$ or 306, it is seen that the aberration of the front member differs at most by 0.00046 mm. from the ideal value in this range of wavelengths.

Fig. 2 and Fig. 3 show telephoto objectives in which the positive member consists of a cemented quadruplet component. Fig. 2 shows the whole objective, and Fig. 3 shows the front component only. In Fig. 3 the front component is a cemented quadruplet in which the arrangement of the elements is such that the positive interface is in front of the negative one, the same arrangement as was shown in my earlier patent and in Fig. 1. In Fig. 2 on the other hand, the arrangement of the lens elements is such that the negative interface is in front of the positive one. It will be observed that the interfaces nest into each other better in this arrangement and so this arrangement tends to reduce the thickness of the component somewhat.

Constructional data for specific examples according to Fig. 2 and Fig. 3, respectively, are given in Figs. 5 and 6 in the same manner as in Fig. 4. This data is as follows:

*Example 2, Figs. 2 and 5*

| Lens | N | V | Radii, mm. | Thicknesses, mm. |
|---|---|---|---|---|
| 1 | 1.5189 | 57.3 | $R_1=+18.657$ | $t_1=3.50$ |
| 2 | 1.6511 | 38.3 | $R_2=-19.685$ | $t_2=1.50$ |
| 3 | 1.6350 | 43.8 | $R_3=-12.019$ | $t_3=1.40$ |
| 4 | 1.6030 | 60.7 | $R_4=+12.019$ | $t_4=2.90$ |
|  |  |  | $R_5=-211.63$ | $S=26.63$ |
| 5 | 1.6109 | 57.2 | $R_6=-10.45$ | $t_5=0.53$ |
| 6 | 1.6050 | 38.0 | $R_7=+7.49$ | $t_6=1.05$ |
|  |  |  | $R_8=-73.23$ | $BF=24.25$ |

*Example 3, Figs. 3 and 6*

| Lens | N | V | Radii, mm. | Thicknesses, mm. |
|---|---|---|---|---|
| 1 | 1.5256 | 54.6 | $R_1=+18.676$ | $t_1=4.00$ |
| 2 | 1.5170 | 64.5 | $R_2=-11.875$ | $t_2=1.40$ |
| 3 | 1.6350 | 43.8 | $R_3=-19.012$ | $t_3=1.40$ |
| 4 | 1.6210 | 61.5 | $R_4=+10.589$ | $t_4=2.80$ |
|  |  |  | $R_5=-688.75$ | $s=25.90$ |

The spherical aberration has been computed for these examples in four colors, C, D, F and G'; and the coma, defined as the sine condition minus the spherical aberration, for the D wavelength. These values are as follows:

*Example 2*

|  | Coma | C | D | F | G' |
|---|---|---|---|---|---|
| f/6.5 | −.200 | −.136 | −.058 | −.062 | +.019 |
| f/7.1 | +.067 |  | +.018 |  |  |
| f/8.3 | −.100 | −.089 | −.035 | −.005 | +.140 |
| f/11 | −.103 |  | −.083 |  |  |
| f/∞ | .000 | +.009 | .000 | −.066 | +.010 |

*Example 3*

|  | Coma, mm. | C | D | F | G' |
|---|---|---|---|---|---|
| f/6.5 | −.002 | −.001 | −.006 | +.007 | +.206 |
| f/7.1 | +.003 |  | +.008 |  |  |
| f/8.3 | +.155 | +.013 | +.086 | +.010 | +.275 |
| f/11 | −.095 |  | −.067 |  |  |
| f/∞ | .000 | +.065 | .000 | −.046 | +.005 |

It will be noted that the spherical aberration and coma are zonally corrected, the secondary color and spherochromatism are nearly corrected, and the residual aberrations are extremely small. The secondary color and spherochromatism can be more completely corrected by using a lower V value in one of the positive elements and by strengthening the curvature of the rear cemented surface of the quadruplet to restore the primary color correction. The other surfaces are also adjusted somewhat to restore coma and marginal and zonal aberration corrections in a manner well known in the art. I have found that changing the curvature of the negative cemented surface and simultaneously changing the curvature of the positive cemented surface three or four times as much in the same direction holds the spherical aberration as a whole without much change but changes one zone with respect to another, or in other words it changes the shape of the spherical aberration curves.

Nearly final computations have been made on a third example according to Fig. 2 in which a low-index glass is used in the rear element of the quadruplet. Schott's KF-6 glass is used in element 1 and FK-5 glass in element 4. Approximate data is given as follows in the same manner as Example 3:

*Example 4*

| Lens | N | V | Radii, mm. | Thicknesses, mm. |
|---|---|---|---|---|
| 1 | 1.51733 | 52.2 | $R_1=+16.6$ | $t_1=5.0$ |
| 2 | 1.65113 | 38.3 | $R_2=-16.1$ | $t_2=2.0$ |
| 3 | 1.635 | 43.8 | $R_3=-10.2$ | $t_3=1.5$ |
| 4 | 1.48742 | 70.0 | $R_4=+13.5$ | $t_4=3.0$ |
|  |  |  | $R_5=-56.6$ | $s=2.47$ |

This example is comparable to the others in residual aberrations, and has a lower Petzval sum, at the cost, however, of using generally stronger surface curvatures.

It cannot definitely be said on the basis of computations thus far completed that one form of the quadruplet is always better than the other. The differences between the examples shown here may be due to differences as in $N_4$ or in the index difference at the positive cemented surface as much as to the different arrangement of the cemented surfaces. Also, of course, the zonal aberration contributed by the rear component must be taken into account, and for a different rear component a different state of correction of the front component is generally best.

All of the types shown embody the important features of the invention and are exceptionally highly corrected for zonal aberrations and are highly useful for the purpose intended in each case.

I claim:

1. A telephoto objective comprising a positive front member and a negative rear member axially aligned between the positive member and its principal focal plane, the focal length of the positive member being less than the focal length F of the objective as a whole and the focal length of the negative member being such that the rear nodal point of the objective is in front of the front surface of the positive member by less than 0.95 F, each member comprising at least one lens component, said objective being characterized by the positive member including a positive lens component which is convex to the front for correcting the coma of the objective and which consists of four lens elements cemented together forming three interfaces hereinafter referred to as the negative interface, the positive interface and the rear interface, the negative interface being concave to the front and having negative power, the refractive index difference at this negative interface being between +0.05 and +0.35 for correcting the marginal spherical aberration, the positive interface being also concave to the front, having positive power and having a radius of curvature between 0.4 and 0.8 times that of the negative interface, the index difference at this positive interface being between —0.003 and —0.035, for correcting the zonal spherical aberration of the objective, the rear interface being behind the other two and being convex to the front, the lens element immediately in front of the rear interface being negative and having a refractive index $N_3$ between 1.6 and 1.9 and a dispersive index $V_3$ between 30 and 50, and the lens element behind this third interface being positive and having a refractive index $N_4$ between 1.38 and ($N_3$+0.05) and having a dispersive index $V_4$ between 1.3 $V_3$ and 100 for correcting the axial chromatic aberration of the objective.

2. A telephoto objective according to claim 1 in which the positive member comprises two compound positive components and the negative member comprises two biconcave compound components and in which the focal length of the positive member is less than one-fourth that of the objective as a whole.

References Cited in the file of this patent

UNITED STATES PATENTS

| | | |
|---|---|---|
| 2,321,973 | Bennett | June 15, 1943 |
| 2,500,017 | Altman | Mar. 7, 1950 |
| 2,576,436 | Baker | Nov. 27, 1951 |
| 2,660,093 | Bertele | Nov. 24, 1953 |

FOREIGN PATENTS

| | | |
|---|---|---|
| 7,229 | Great Britain | of 1913 |